US008235645B2

(12) United States Patent
Garth

(10) Patent No.: US 8,235,645 B2

(45) Date of Patent: Aug. 7, 2012

(54) CARRIAGE ASSEMBLY

(75) Inventor: Harald Garth, Immenstadt (DE)

(73) Assignee: Harald Garth, Immenstadt (DE)

(*) Notice: Subject to any disclaimer, the term of this patent is extended or adjusted under 35 U.S.C. 154(b) by 914 days.

(21) Appl. No.: 12/218,692

(22) Filed: Jul. 17, 2008

(65) Prior Publication Data

US 2010/0013364 A1 Jan. 21, 2010

(51) Int. Cl.
*B65G 47/00* (2006.01)

(52) U.S. Cl. ...................... 414/751.1; 198/463.2; 29/759

(58) Field of Classification Search ............... 198/463.2, 198/463.3; 414/751.1; 29/418, 759, 760
See application file for complete search history.

(56) References Cited

U.S. PATENT DOCUMENTS 3,999,270 A * 12/1976 Witte .............................. 29/749
4,182,029 A * 1/1980 Nijman ........................... 29/749
4,343,589 A * 8/1982 Snyder et al. .............. 198/468.2
4,740,134 A * 4/1988 Dixon ........................... 414/733
5,649,804 A * 7/1997 Schychuck .............. 198/750.11
5,657,531 A * 8/1997 Sato et al. .................. 29/603.04
5,937,504 A * 8/1999 Esteves et al. ............... 29/564.6
6,581,750 B1 * 6/2003 Tweedy et al. ........... 198/377.07
7,004,522 B2 * 2/2006 Nagai et al. .................. 294/64.1
7,160,172 B2 * 1/2007 Frost et al. ........................ 451/5

FOREIGN PATENT DOCUMENTS

DE 295 11 071 U1 9/1995
DE 44 35 282 A1 4/1996
DE 103 27 018 B3 10/2004

* cited by examiner

*Primary Examiner* — Douglas Hess
(74) *Attorney, Agent, or Firm* — Kriegsman & Kriegsman

(57) ABSTRACT

The present invention relates to a carriage assembly having a housing, having a cam disc and having a carriage which is guided in a linearly movable fashion, with the cam disc and carriage being operatively connected to one another. In order to specify a carriage assembly which is of the smallest possible construction, the invention proposes that a cam disc is arranged orthogonally with respect to a rear side of the housing.

18 Claims, 12 Drawing Sheets

CARRIAGE ASSEMBLY

Figure 1:
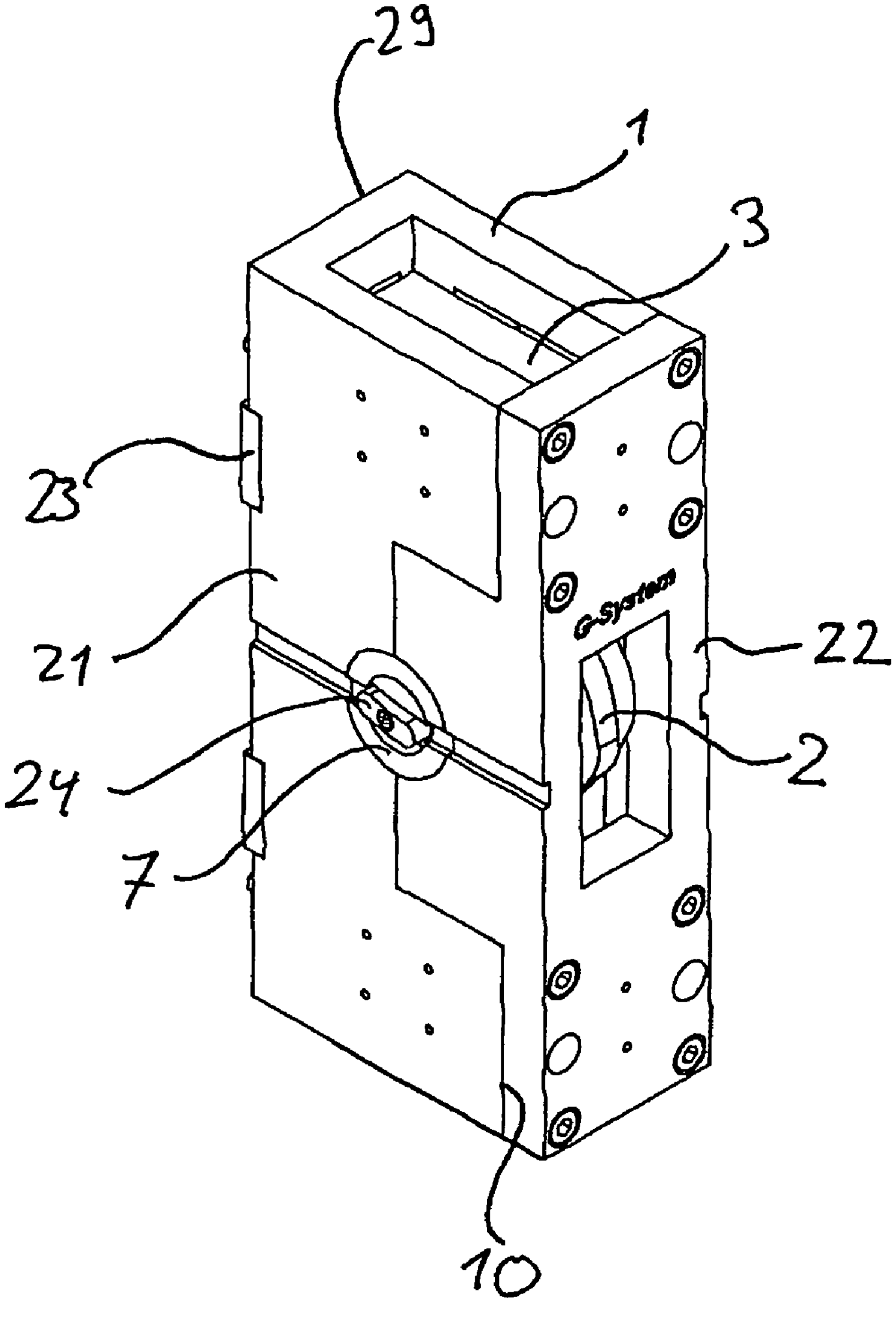

The present invention relates to a carriage assembly having a housing, having a cam disc and having a carriage which is guided in a linearly movable fashion, with the cam disc and carriage being operatively connected to one another, and with the cam disc being arranged orthogonally with respect to a fastening plane of the housing.

The present invention also relates to a workpiece transport device which uses a carriage assembly of said type and to the arrangement of a plurality of carriage assembly combinations to form a special machine.

Carriage assembles are used, as drives and controllers for tools or tool carriers, for handling devices or for transport devices, in special machines for punching, bending and assembling sheet metal parts or plastic parts. Said carriage assemblies perform more than 100 working strokes per second, often more than 400 per second. Here, the carriage units are fastened with their housing to the special machine, which also supports the drives of the carriage assembles and any drive force transmission arrangements. A driven cam disc is mounted on the housing of the carriage assembly. Here, the cam disc has a working cam disc and, spaced apart axially from the latter, a return cam disc, with the cam disc being operatively connected, by means of incident take-off rollers for the working and return discs, to a carriage which is guided in a linearly movable fashion. Here, the take-off rollers transmit to the carriage the forces which are transmitted by the cam disc. In turn, the carriage carries a tool, a tool receptacle, a handling device or is connected to a workpiece transport device.

Since said special machines generally have a plurality of workstations arranged in series in the processing direction, for example a plurality of bending stations with preceding punching stations or one or more stations in which a base body is fitted with different components which are brought to the assembly line in sequence, said special machines likewise have a plurality of carriage assembles which are often arranged directly adjacent to one another. In special machines for machining small workpieces, it can be the case, in particular in multi-stage workstations without intervening workpiece transport, that the conventional carriage assembles which are arranged directly adjacent to one another can only apply their tools/handling devices to the workpiece by means of off-setting or the like. This has great disadvantages since, on account of the high number of cycles and the force transmission direction being different from the movement direction of the carriage, absolutely precise adjustment of the carriage assembly with constant re-adjustment is necessary, since, especially in the case of workpieces composed of soft material such as plastic, precise, damage-free machining cannot be ensured.

In order to avoid these space-related problems, it is known to also use pneumatic, hydromechanical or electrical tool and transport device drives instead of mechanical tool and transport device drives for special machines. Although said drives are smaller than the known carriage assembles, they however cannot operate in a satisfactory manner, or require considerable control expenditure, at the high number of cycles mentioned in the introduction and under the required complex demands with regard to the adjustment of the stroke position, the maximum stroke, the setting-down speed, the constancy of the linear movement, the minimization of the dead phase, a dwell at dead centre and the like. In principle, mechanical tool and transport drives and therefore the carriage assembles would be preferable.

DE 295 11 071 and DE 103 27 018 disclose carriage assembles in which the cam discs are arranged parallel to a fastening side of the carriage assembly and parallel to a workpiece processing direction. Said cam discs are accessible from a machine operating side, such that they may be exchanged. Said cam discs are in an overhung arrangement. In said carriage assemblies, the maximum diameter of the cam disc defines the width of the carriage assembly, such that the carriage assemblies may be moved no closer to one another than the diameter of a cam disc. Here, conventional widths are more than 200 mm. To reduce the spatial requirement of a carriage assembly, it is known from DE 44 35 282 to provide two L-shaped supports which, with their long limbs, are fastened back-to-back to one another and, with their short limbs, are fastened, parallel to the workpiece processing direction, to a special machine, with the cam discs being fastened, orthogonally with respect to said workpiece machining direction, in each case to the long limb of the L-shaped carrier. The drive of the cam discs takes place by means of gearwheels through the long limb from the rear side of the special machine. As a result of said arrangement, the selected width is reduced to approximately 200 mm for two carriage assemblies, with the exchange of cam discs again taking place from a machine operating side, but under more difficult conditions than in the carriage assemblies mentioned in the introduction. Disadvantages of this prior art are however firstly that the cam discs are still in an overhung arrangement, which results from the selected fastening situation, and secondly the unfavourable guidance of the carriage through an angle of 90°. The latter is guided at its upper end by a frame which is fastened from above to the double-L support, and at its lower end in a groove of a guide plate, with the guide plate being arranged on the special machine parallel to the workpiece processing device.

It is therefore an object of the present invention to specify a carriage assembly which is of small construction and which can be subjected to high loading and which can be used as a tool carrier, a handling device drive or a transport device drive. It is likewise an object of the invention to specify a workpiece transport device which permits high numbers of cycles, and finally to specify a special machine which permits high numbers of cycles while being of small structural size.

The first object is achieved in that the cam disc is designed to be mounted axially at both sides and the carriage is designed to be guided in the interior of the housing. This arrangement of the cam disc advantageously makes it possible to keep the carriage assembly width independent of the cam disc diameter, but simultaneously has the result that the cam disc is mounted in a stable fashion, and thereby drives a carriage in a constant fashion with unchanging parameters, such as for example stroke length and stroke duration, over a long period of time at high numbers of cycles and therefore high rotational speeds. The invention highly advantageously utilizes the free space in front of and behind the carriage assembly. Here, it is not necessary for the cam disc to be arranged centrally in the housing; an eccentric arrangement is by all means conceivable. As a result of the carriage being arranged in the interior of the housing, a closed, functionally reliable design is created, and the carriage is always guided in a reliable fashion even at high numbers of cycles.

In one refinement of the invention, it is provided that the cam disc has a working cam disc and, spaced apart axially from the latter, a return cam disc, and/or that the cam disc is composed of hardened material, is in particular formed in one piece. This advantageous refinement of the invention of the cam disc permits a carriage assembly which operates in a particularly precise manner. The hardened material results in a long service life without significant instances of wear on the running surface of the cam discs. On account of the single-piece design, the cam disc according to the invention can be produced in an extremely precise fashion, and the assembly of individually produced parts with the unavoidable tolerances involved is avoided.

As a result of take-off rollers being arranged between the cam disc and carriage, the force which the cam disc exerts on the carriage is transmitted particularly efficiently without losses. Here, the carriage particularly advantageously has at least one take-off roller bearing arrangement and at least one connecting device, preferably two connecting devices which are situated opposite on both working sides of the carriage. A compact component is highly advantageously provided in this way. The connecting device permits the connection of a tool, a tool retainer, a handling arrangement or other devices which are to be driven. The invention particularly advantageously proposes to provide connecting devices on both working sides of the carriage, with working sides being understood to mean those sides of the carriage which reach the top and bottom dead centres of the linear movement of the carriage. Here, the type of connecting device is coordinated with the application, and can range from simple T-grooves to complex connecting systems.

As a result of the carriage being formed in at least two parts, preferably with a parting surface which is parallel to the fastening plane of the housing, it is highly advantageously possible in combination with a likewise two-part housing, which is formed in the same way, for the cam disc to be exchanged in a simple manner from an operating side of the carriage assembly. While the housing and the carriage remain connected to one another and to the special machine, a simple exchange of the cam disc may take place.

The carriage guides, which are provided in one refinement of the invention, in the interior of the housing, preferably in the form of a plurality of guide plates, permit reliable guidance of the carriage. It is provided according to the invention that said guide plates remain undisturbed in their installed position during a cam disc exchange. Accordingly, said guide plates are arranged such that they remain in that part of the housing which is fixedly connected to the special machine. As guides, consideration is given in particular to maintenance-free plain bearings with graphite lubrication or plain bearings composed of special bronzes. This permits the use of the carriage assemblies according to the invention in clean spaces or in the production of oil-sensitive workpieces. Instead of guide plates, it is also possible to use sleeves if rotationally symmetrical carriages are to be used. As guides for the carriage, consideration is given to linear guides of a wide variety of designs, such as for example roller shoes. Depending on the application, it is also possible to provide central lubrication.

As a result of the carriage assembly according to the invention having a cam disc shaft which supports the cam disc and which is of multi-part design, with a detachable locking device being provided between some of the parts in such a way that the cam disc can be removed from the cam disc shaft, a simple exchange of the cam discs is highly advantageously permitted, such that the carriage assembly according to the invention can be easily adapted to a different application.

If the locking device is formed as a cross-shaped groove with a groove wedge in those parts of the cam disc shaft which can be removed together with the cam disc, and if other parts of the cam disc shaft are formed so as to remain in the device, preferably so as to remain in bearings, it is highly advantageously obtained that the bearing situation of the cam disc shaft remains undisturbed during a cam disc exchange. This lengthens the service life and the precision of the carriage assembly according to the invention. As a result of the locking connection, it is ensured that the shaft, as a uniform component, transmits the drive forces to the cam disc without losses.

The object is also achieved by means of a system composed of a plurality of carriage assemblies, in which individual carriage assemblies are designed such that they can be connected to one another by means of connecting shafts at the ends of the cam disc shafts or by means of direct form-fitting engagement of the cam disc shafts into one another. As a result of the connection of carriage assemblies according to the invention, the advantage of the small structural width on account of the alignment of the cam disc is readily apparent. On account of the small structural width, it is possible for even the smallest of workpieces to be machined without it being necessary for the tools to be guided to the workpiece via off-sets or the like.

The advantages of the invention become particularly clear if the described carriage assembly is used as a controller and/or drive of a handling device, in which said carriage assembly is connected by means of two connecting devices of its carriage to the handling device. Here, handling is to be understood to mean any manipulation of a workpiece which leads to a change in spatial position, that is to say rotations, tilting, linear transport, transfer, etc. As a result of the connection of a carriage at both sides to a handling device of said type, devices are obtained which operate in a particularly precise manner.

The further object of the invention is achieved by means of a handling device, in particular workpiece transport device, having a workpiece transport comb, having a disengagement device which is articulatedly connected to said workpiece transport comb by means of a deflecting limb, and if appropriate having a workpiece fixing unit, with the workpiece transport comb and disengagement device being arranged on in each case one carriage assembly according to the above description. A handling device of said type operates in a precise, constant and permanent manner.

Finally, the invention encompasses a workpiece fixing unit which is embodied as a tilting lever which is designed to be driven by a carriage assembly as described above.

The invention is described by way of example in terms of a preferred embodiment and with reference to the drawing, wherein further advantageous details can be gathered from the figures of the drawing.

Here, functionally identical parts are provided with the same reference numerals.

Figure 2:
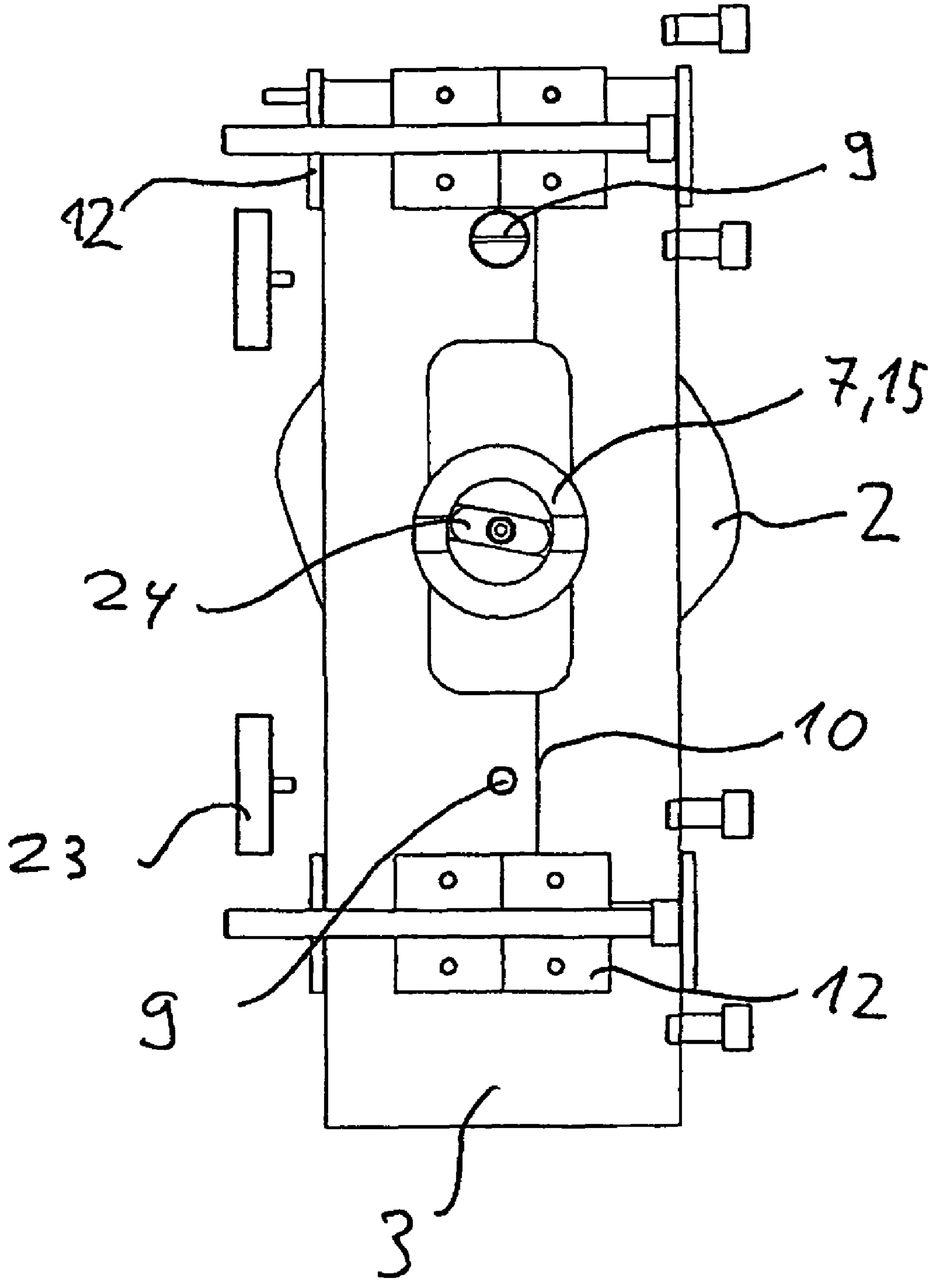
Figure 3:
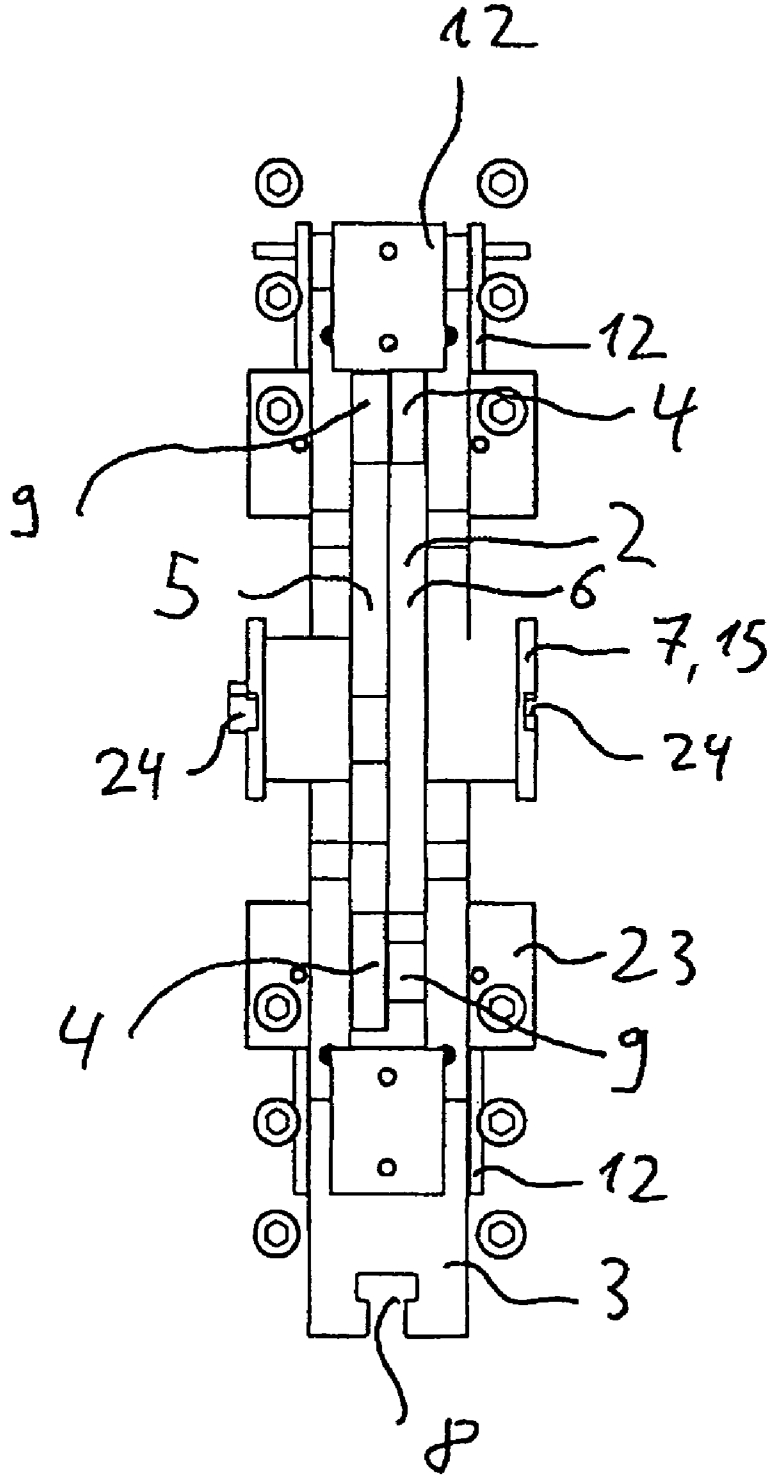
Figure 4:
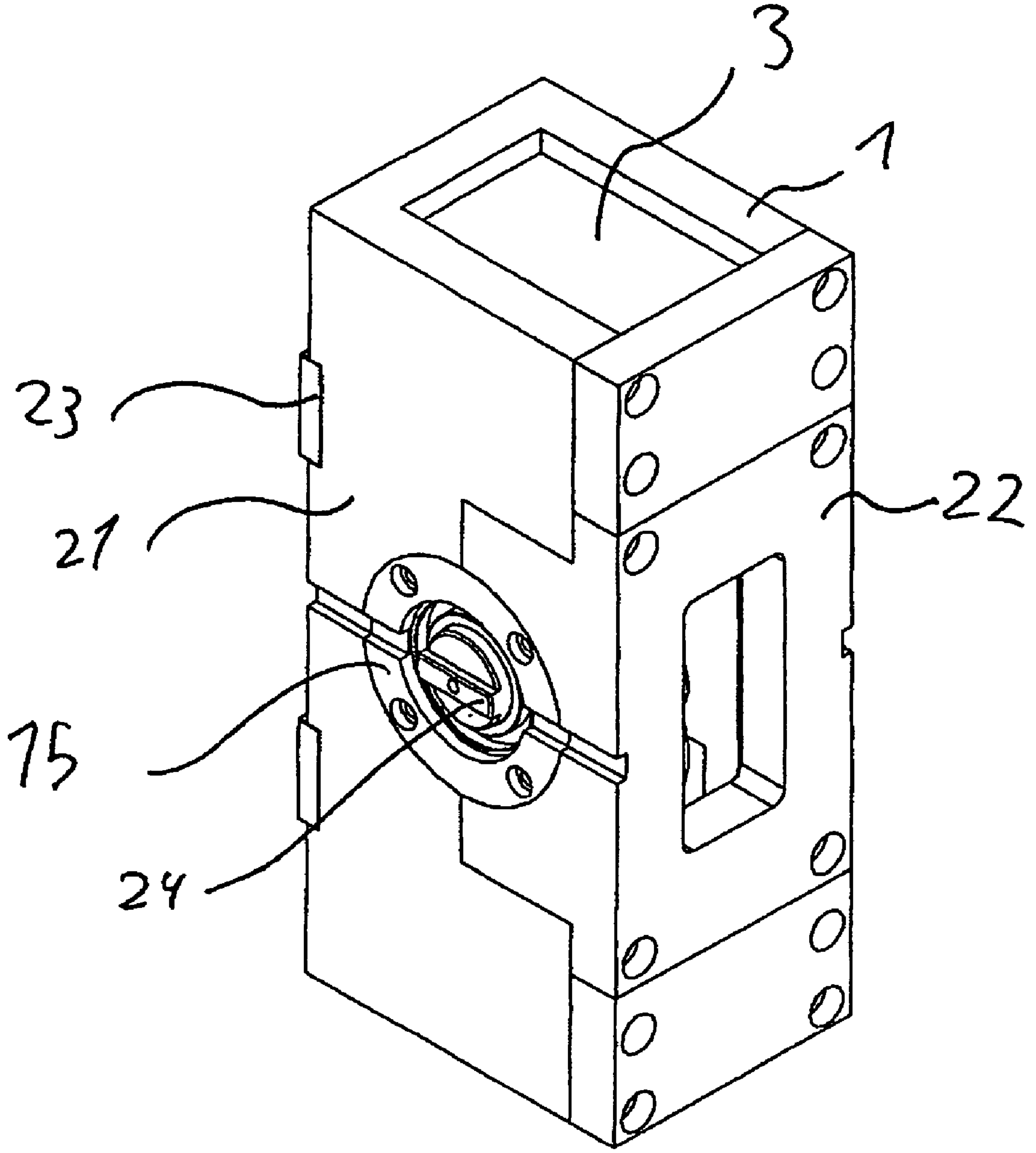
Figure 5:
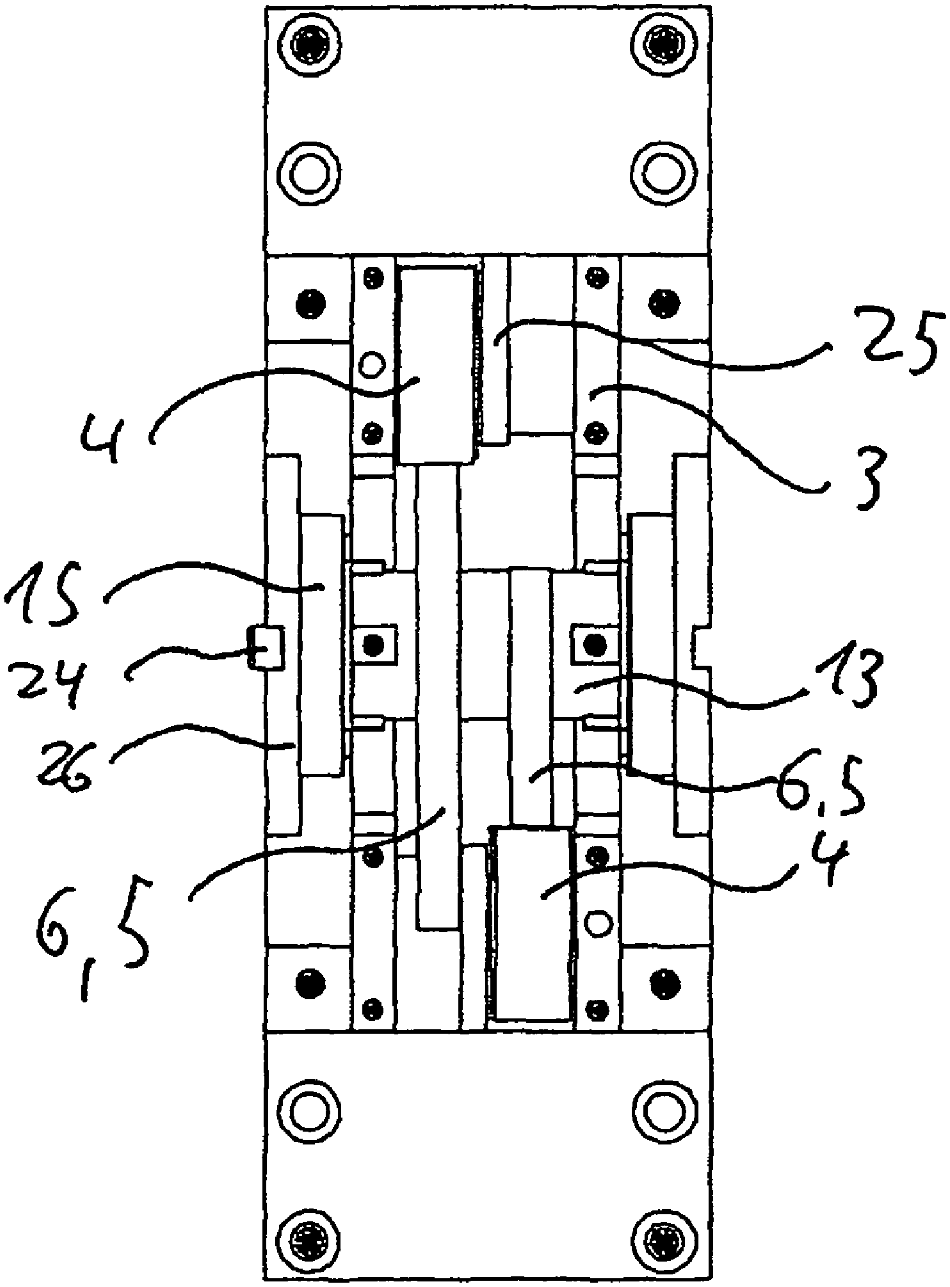
Figure 6A:
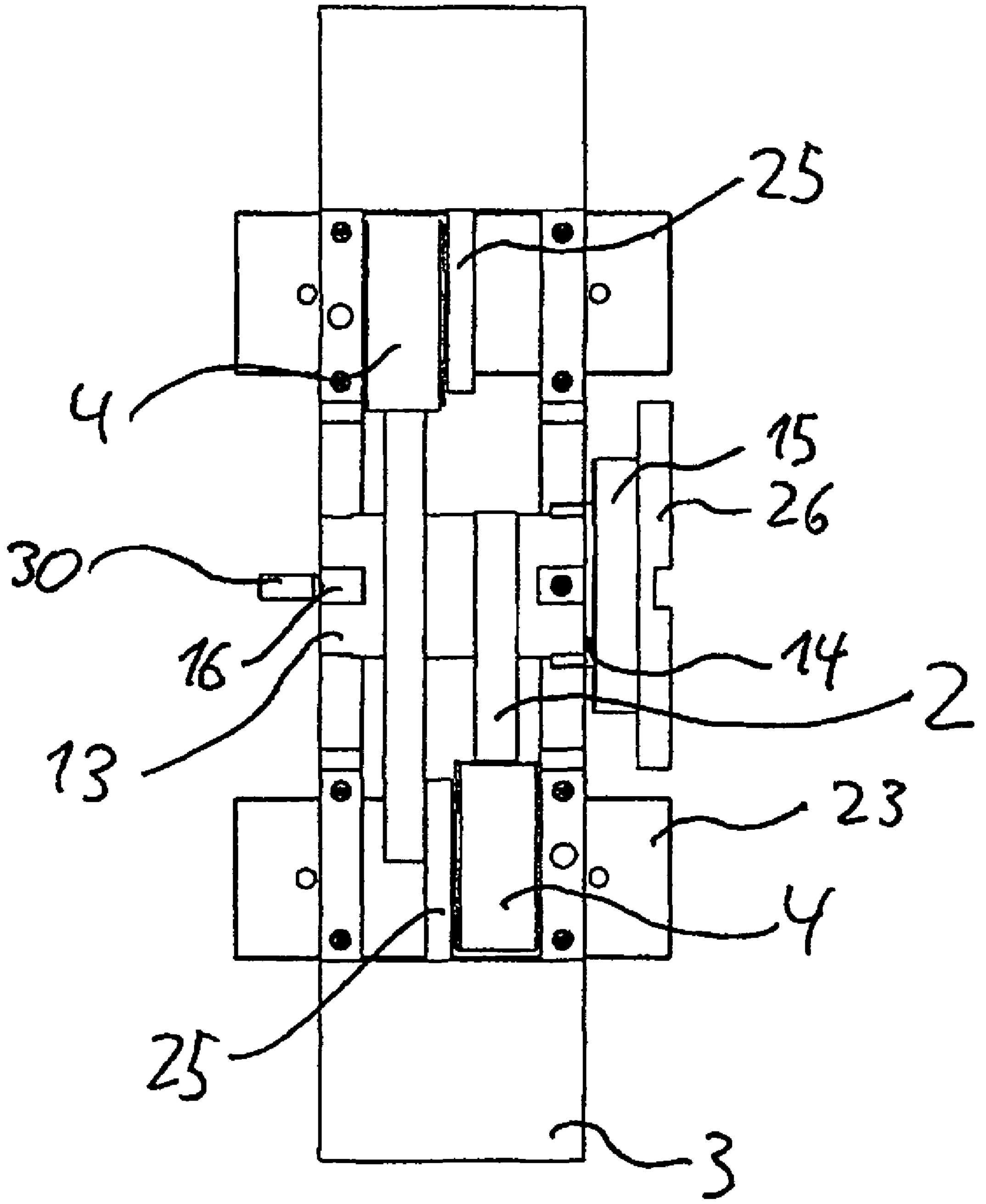
Figure 6B:
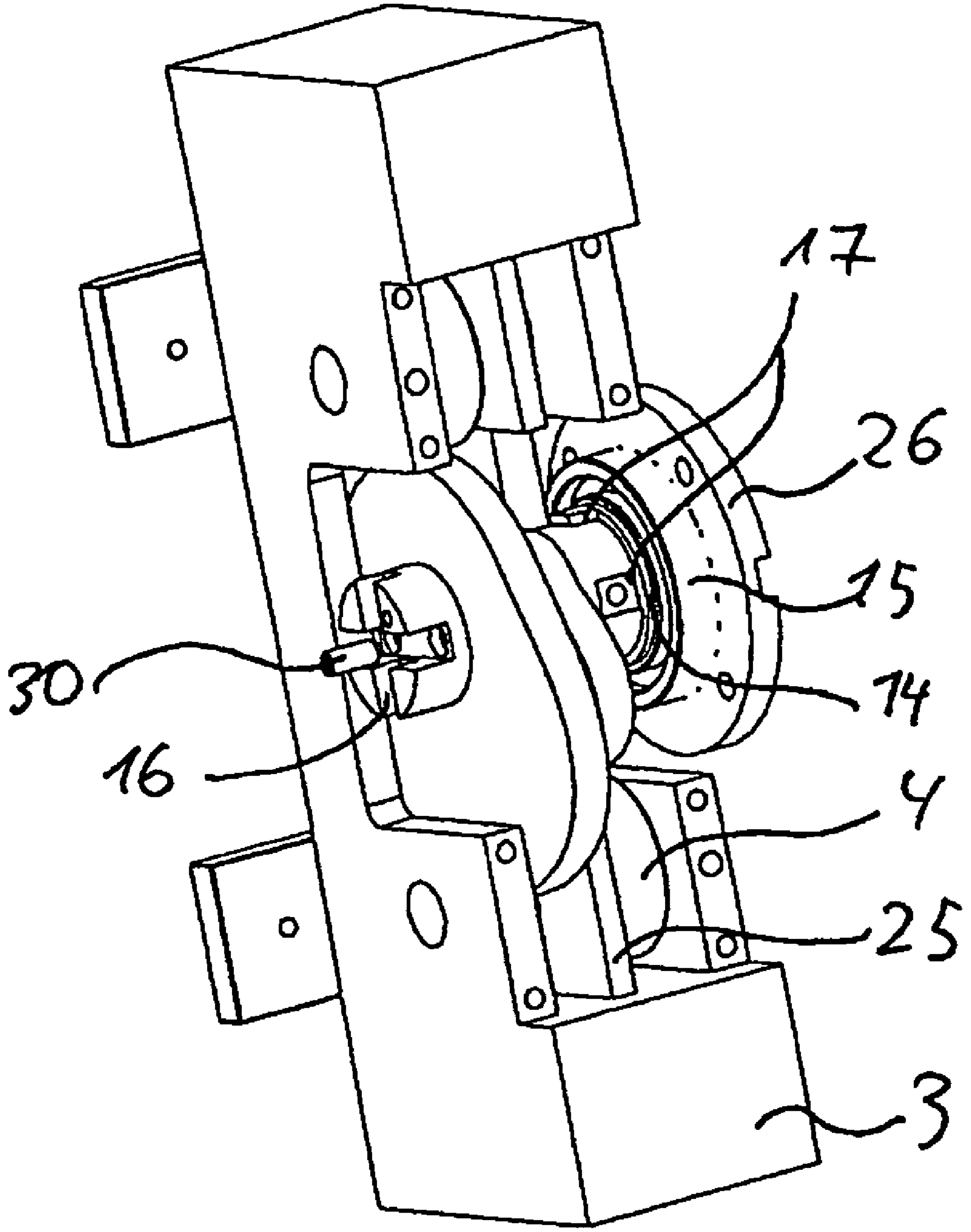
Figure 7:
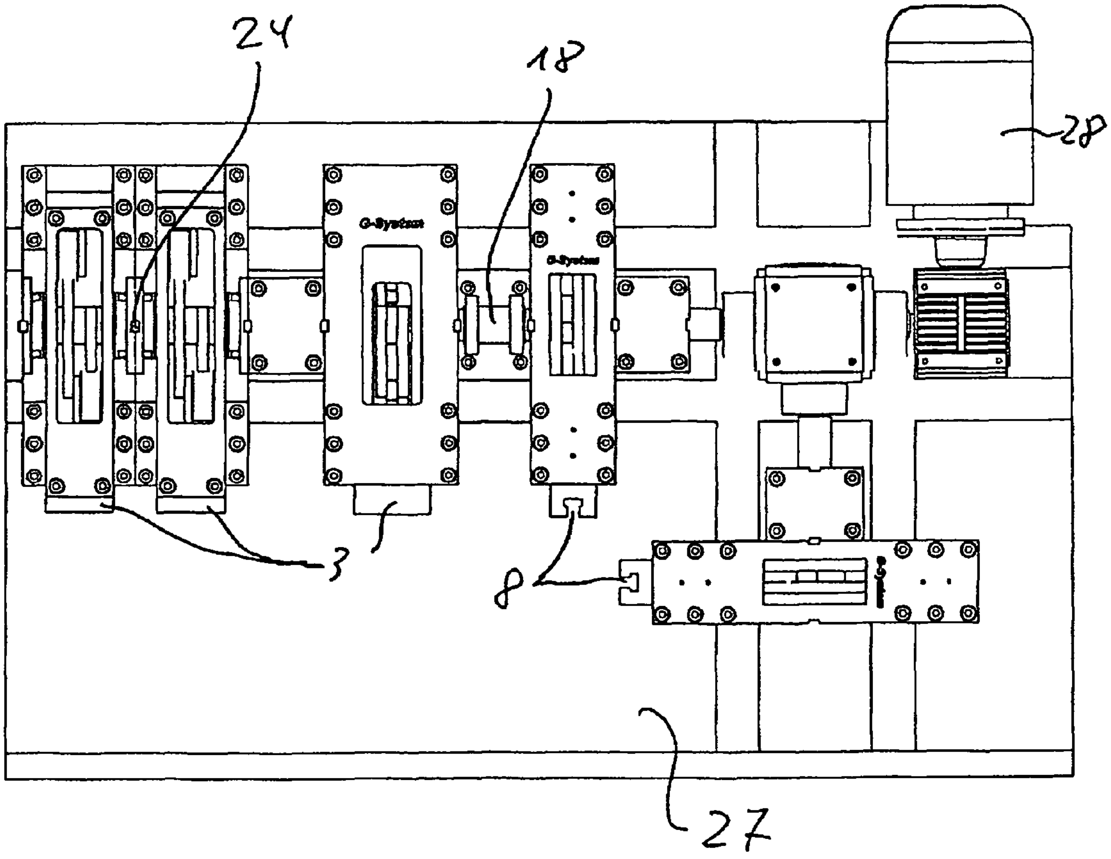

In detail, in the figures of the drawing:

FIG. 1 shows a perspective view of a carriage assembly according to the invention, FIG. 2 shows a partially sectioned side view of a carriage assembly according to the invention, FIG. 3 shows a partially sectioned front view of a carriage assembly according to the invention, FIG. 4 shows a perspective view of a second embodiment of the invention, FIG. 5 shows a partially sectioned front view of the second embodiment, FIG. 6 shows a cam disc shaft and FIG. 7 shows an arrangement of a plurality of carriage assemblies according to the invention.

FIG. 1 shows a perspective view of a carriage assembly according to the invention having a housing 1, with the housing 1 being formed in two parts, having a rear part 21 and a front part 22, with the front part 22 and rear part 21 having a parting surface 10 which is arranged parallel to the fastening plane 29 of the housing 1. The housing 1 is fastened with its rear part 21 to a support device (not illustrated) of a special machine (not illustrated), with in particular the fastening wedges 23, or corresponding wedge-shaped fastening grooves 23, serving for this purpose. According to the invention, the front part 22 is likewise designed such that it does not cover the whole front side but rather only a part thereof. A linearly movable carriage 3 is arranged and guided in the housing 1. Arranged within the carriage 3 and the housing 1 is a cam disc 2, with the latter being aligned orthogonally with respect to the fastening plane 29 of the housing 1. Said cam disc 2 is therefore likewise aligned orthogonally with respect to a workpiece transport direction. FIG. 1 also shows an opening in the housing 1, in which opening a bearing 7 is arranged under a cover. The cam disc shaft 13 is mounted in the bearing 7; said bearing 7 may be a roller-ball bearing, a spherical roller bearing, a self-aligning bearing or some other suitable type of bearing. It is possible to clearly see the coupling adapter 24—a face spline connection—which serves to connect two carriage assemblies according to the invention, and which has a counterpart in a groove in the cam disc shaft 13 on that side of the housing 1 which is not illustrated. Likewise illustrated are bores in the housing 1, which bores serve for fastening guide plates 12 of the carriage 3. The structural width of this embodiment is 51 mm, though said embodiment can also be of even smaller design with suitable adaptation of wall thicknesses and cam disc thickness. It is therefore highly advantageously possible to accommodate approximately four carriage assemblies according to the invention in a space of 200 mm. Here, the diameter of the individual cam discs can be significantly larger, since said diameter is independent of the device width. The cam disc 2 may project out both forward and also if appropriate rearward through a slot in the housing and/or of the special machine wall.

FIG. 2 shows a side view of the carriage assembly according to the invention with the housing 1 omitted. It is possible to clearly see the two-part carriage 3 and the holding opening for the cam disc shaft 13 in the carriage, which holding opening 13 is formed in the manner of a slot-shaped recess. It is also possible to see the bearing bores 9, which are arranged in the carriage 3, of the take-off rollers 4. As can be seen from FIG. 2, the axles on which the take-off rollers 4 are arranged have a different diameter to the right of a take-off roller 4 than to the left of the take-off roller 4. This means that axial mobility of the take-off rollers 4 is advantageously prevented. Also illustrated are the guide plates 12 which are arranged between the housing 1 and the carriage 3. It can be seen that in each case four plates 13 are arranged around the carriage 3 above and below the cam disc 2. Said guide plates 13 are for example composed of special bronzes, sintered metals or graphite bronzes, but as indicated, may also be formed as sleeves or roller shoes. It is essential to the invention that the carriage is guided at both sides of the cam disc 2 in a reliable and, where necessary, lubricant-free manner. Viewing FIG. 1 and FIG. 2 together, it is clear that a cam disc 2 can be easily exchanged for another cam disc 2 when the carriage assembly is installed by virtue of firstly the front part 22 of the housing 1 being released and then the front part of the carriage 3 being released and removed. The cam disc 2 together with its bearings 15 is then freely accessible and can be removed forward as viewed in the operating direction.

FIG. 3 shows the view of the carriage assembly from the front with the housing 1 and the front part of the carriage 2 omitted. It is possible to clearly see the connecting device 8 which is provided according to the invention for connecting any devices which are to be driven, such as a tool, tool carrier, handling arrangement or transport device. Said connecting device 8 is embodied here as a simple T-shaped groove. It is likewise possible to use any other connecting device known to a person skilled in the art. According to the invention, the carriage 3 may also be designed so as to project upward out of the housing 1 and, there, to support a second connecting device 8 which may be selected to be different from the first. It is also possible to see the take-off rollers 4 which bear in each case against the working cam disc 5 and the return cam disc 6 and which produce the operative connection to the carriage 3.

FIG. 4 shows a perspective view of a second, wider embodiment of the carriage assembly according to the invention. In this embodiment, too, the housing 1 is formed in two parts with a rear part 21 and a front part 22, with the front part 22 not covering the entire front side but rather being split such that the guide plates 12 remain in their installed situation when the front part 22 is released and removed. This embodiment differs primarily by means of a different bearing situation both of the cam disc 2 and also of the take-off rollers 4. This is illustrated in greater detail in FIG. 5. Said embodiment is suitable for transmitting greater forces and is provided for applications in which larger strokes or higher pressures must be exerted. Its field of use is therefore different from that of the first embodiment, which is provided in particular for applications in small tabletop machines and with small and extremely small workpieces.

FIG. 5 shows a sectioned front view of the second embodiment with the front part 22 and the front part of the carriage 3 omitted. It can be clearly seen that the carriage 3 has an internal web 25 for holding the bearing arrangement of the wider take-off rollers 4. This is necessary in order to reliably transmit the greater forces in this embodiment to the carriage 3. Also illustrated is the installed situation of the cam disc shaft 13. The cam disc 2 is connected on each side to a cam disc shaft part. The cam disc shaft 13 is composed of a plurality of parts, one of which is arranged so as to be positionally fixed in a bearing 15, in this case a roller-ball bearing with a bearing cover 26. Said part is referred to as a shaft adapter 14.

FIG. 6*a* shows a detail of the bearing situation. It is possible to see the connection between the shaft adapter 14 and the cam disc shaft 13, with the shaft adapter 14 and the roller-ball bearing 15 remaining installed in the housing 1 when the cam disc 2 is removed. The shaft adapter 14 is connected in a force-fitting manner by means of a cross-shaped groove 16 in that shaft part which is releasable together with the cam disc 2, and a groove wedge 17 which is inserted therein. On the left-hand side of the illustrated device, the bearing cover 26, the roller-bearing housing 15, the shaft 14 and the groove wedge 17 have been graphically removed. Illustrated is the cross-shaped groove 16 in that shaft part which is connected to the cam disc 2, and a spring-loaded ball pin 30 by means of which the shaft adapter 14 is fastened to the cross-shaped groove 16. To remove the cam disc 2, after the removal of the groove wedges 17, the releasable parts of the cam disc shaft 13 are removed from the shaft adapter 14 after the cam disc has been rotated by 90°, with the shaft adapter 14 being open to the front. In this way, the cam discs 2 may be exchanged in a simple manner, such that the carriage assembly according to the invention can be adapted in a simple, fast and uncomplicated manner to different production parameters of the special machine.

FIG. 6*b* shows the image from FIG. 6*a* in a perspective view.

FIG. 7 shows a front view of a multiple construction with the carriage assemblies according to the invention. Illustrated on a machine wall 27 is a carriage assembly drive 28 which acts on five carriage assemblies. In the horizontal carriage assembly row, said carriage assemblies are connected either to a connecting shaft 18 or else directly to one another via a groove and coupling adapter 24. The connecting shaft 18 is adapted in length to the spacing between the carriage assemblies which is required for handling. This allows the carriage assemblies to be arranged independently of a grid. The two left-hand carriage assemblies are illustrated with the housing 1 open; the housing has likewise been removed in the case of one housing around a connecting shaft 18. It can be seen that two carriage assemblies according to the invention may be arranged directly adjacent to one another without the dimensions of the cam discs causing a hindrance.

Figure 8:
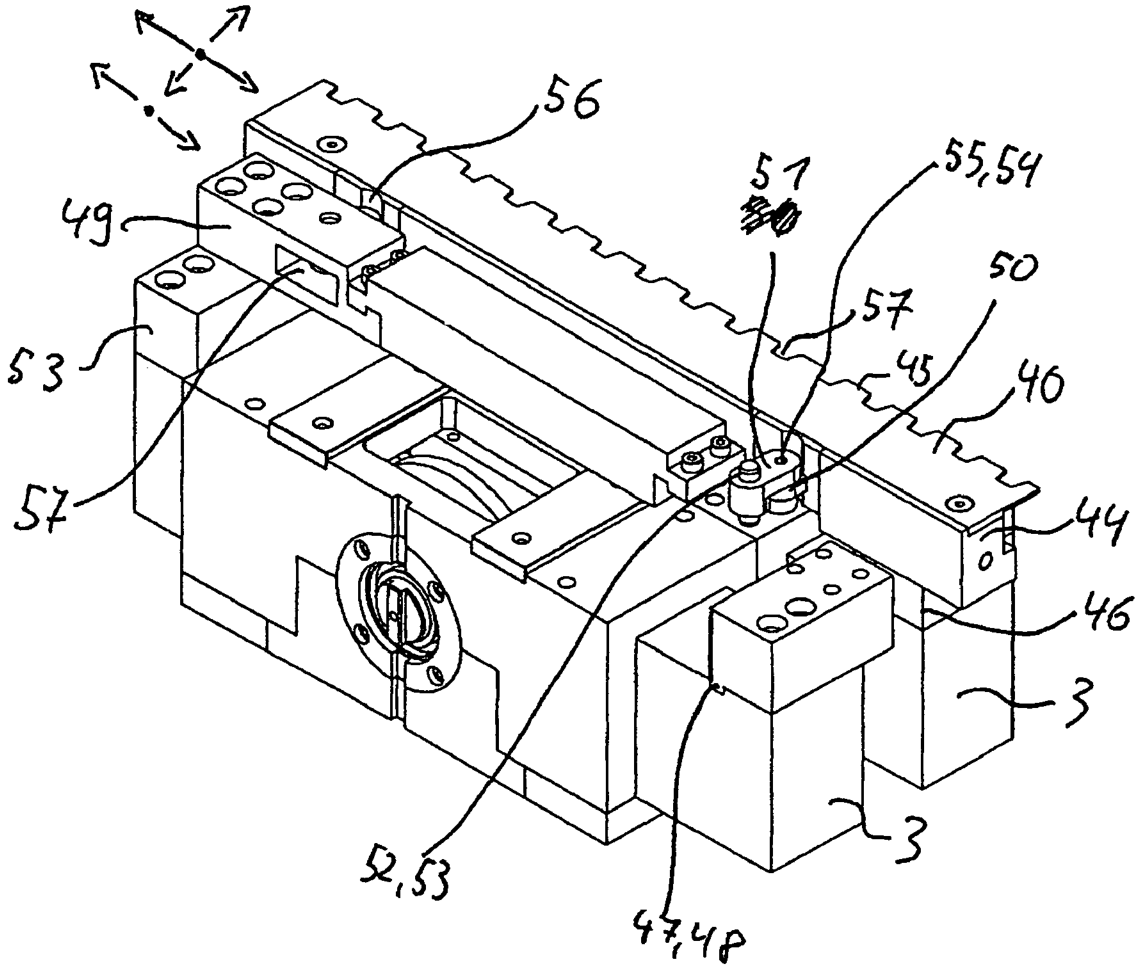
Figure 9A:
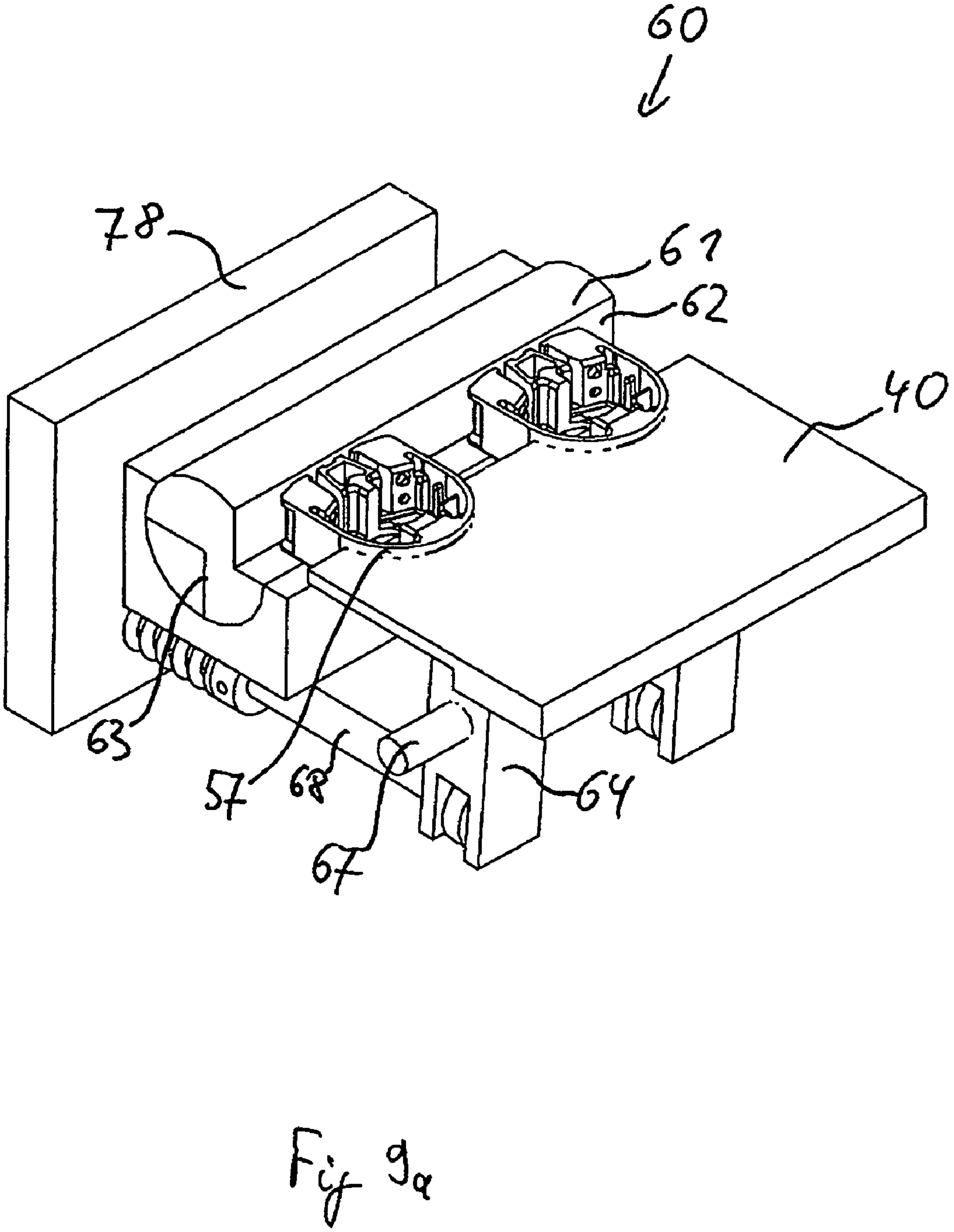
Figure 9B:
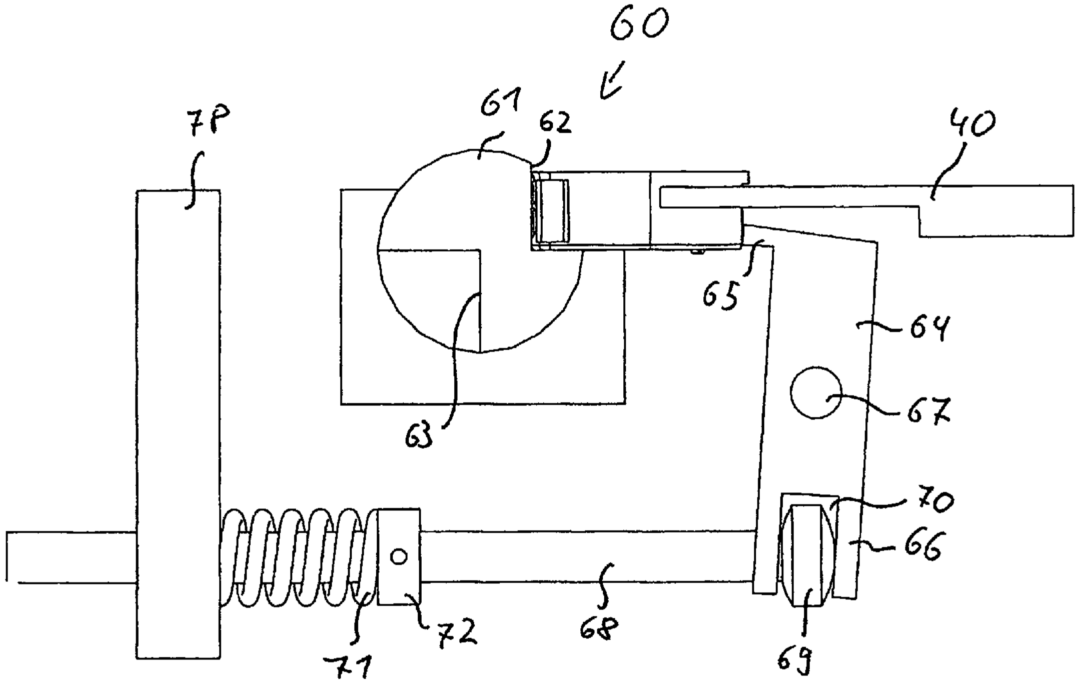
Figure 10:
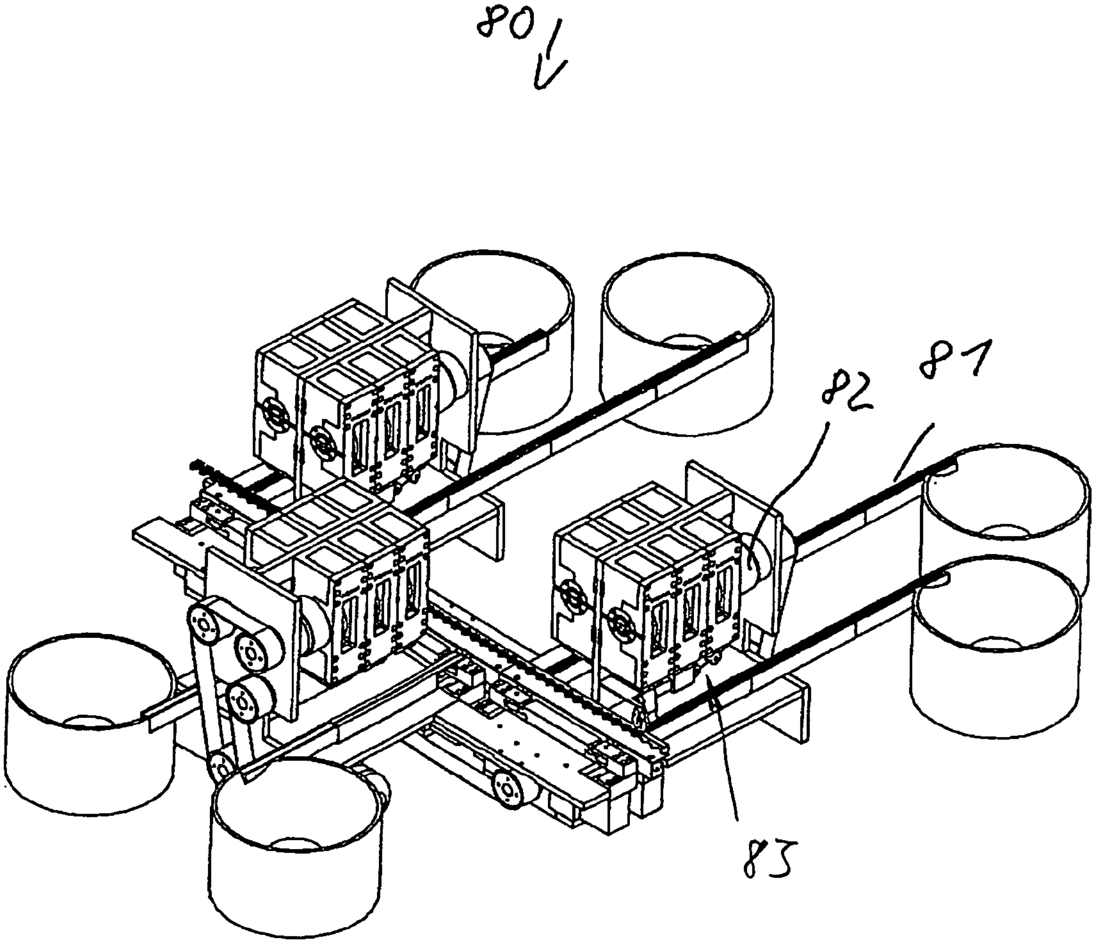

Finally, the invention also encompasses a use of the carriage assembly as a drive of a handling arrangement or as the handling arrangement itself. This is explained on the basis of FIGS. 8 to 10, in which, in detail:

FIG. 8 shows a perspective view of a workpiece transport device according to the invention, FIGS. 9*a, b* show a workpiece clamping device using a carriage assembly according to the invention, and FIG. 10 shows a sketch of a special machine in a linear arrangement.

FIG. 8 shows an embodiment of the workpiece transport device according to the invention. Said workpiece transport device is composed of a workpiece transport comb 40, in whose chambers 57, which are open to one side, the workpiece is held and transported. For this purpose, the workpiece transport comb 40 is arranged on a rail 44 in such a way that the comb ends 45 project beyond the rail 44. The rail 44 is itself fastened by means of in each case one driver 46 to in each case one end of a carriage 3 of a carriage assembly. Here, the drivers 46 have a tongue 47 which engages into a groove 48 on that side of the carriage 3 which faces toward the drivers 46. AS a result of being arranged on a carriage 3, the rail 44, and with it the workpiece transport comb 40, can perform a linear movement, the extent of which is determined by the cam disc 2 of the carriage assembly. In order to engage and disengage the workpiece transport comb 40, that is to say to add a movement in the direction of the Y-axis to the movement in the direction of the X-axis, a slide 49 is provided which is formed so as to be articulatedly connected to the workpiece transport comb 40. The articulated connection is produced here by a deflecting limb 50 which is fastened to the rail 44 and which is articulatedly connected to a deflecting lever 51 which is formed so as to be articulatedly connected to the slide 49. The deflecting lever 51 is of oval design, with a bore 53 being provided at the first centre point, through which bore 53 extends an axle 52. Situated at the other centre point is a bore 54 into which engages a pin 55 which is fixedly connected to the deflecting lever 50. The deflecting lever 50 has a recess 56 which is matched to the rounding of the deflecting lever 51 and in which the one end of the deflecting lever 51 can slide. The slide 49 is likewise formed so as to be connected to a carriage assembly, with the connection being produced by means of two drivers 53 which are fixedly connected to a carriage 3. The slide 49 likewise performs a linear movement, which is parallel to that of the workpiece transport comb 40. The carriage assembly of the slide 49, however, has an excess stroke in relation to the workpiece transport comb 40, such that the deflecting lever 51 performs a movement which either engages or disengages the deflecting lever 50 and therefore the workpiece transport comb 40. In this way, a workpiece is either released or received in a chamber 57 between two comb ends 45. Said movement is possible since the slide 49 has two chambers 57 in the region of the deflecting lever 51, such that the former can perform a pivoting movement.

The carriage assemblies provided according to the invention are preferably coupled to one another such that only a single drive is required. The described device is between 10 mm and 2000 mm long, preferably 512 mm, and can be easily coupled to other identical devices such that it is possible to realize long workpiece transport paths. It is likewise provided according to the invention that two devices may be coupled to one another in such a way as to differ in terms of their operating side, that is to say a workpiece is received in a chamber 57 with its right-hand side and subsequently with its left-hand side. This is advantageous whenever components must be fitted on different sides of a workpiece. A rotation of the workpiece may thus advantageously be avoided.

The described device may be combined with at least one further device in such a way that these are positioned together on the same side along a transport path, and the combs 40 are co-ordinated with one another in a grid in such a way as to provide a seamless handover from one device to the next. It is likewise possible for said devices to be arranged opposite one another in an alternating fashion. It is also possible for two or more devices to be arranged mirror-symmetrically with respect to one another such that, as it is transported, the at least one workpiece is transported in a clamped fashion by means of the opposing chambers 57 of the combs 40. In this way, secured transport, and also a positive handover of the transported workpiece, are made possible, or the workpiece can be held in an assembly station.

Instead of the combs 40, it is also possible to provide further modules, tools or handling devices on the carriage assembly. For example, a roller guide may be fastened to the rail, which roller guide can additionally perform a stroke movement by means of the carriage assembly.

Furthermore, said arrangement which is described in FIG. 8 may be used rotated through 90°, such that the workpiece transport comb 40 performs a movement in the z-direction and a movement in the x-direction. In this way, it is for example possible for a workpiece which is resting on the workpiece transport carrier to be conveyed in the longitudinal direction by a transport device below the workpiece transport carrier.

FIGS. 9*a,b* show an embodiment of a workpiece clamping arrangement 60 which can be used in connection with the above-described workpiece transport device. The illustration shows only two chambers 57 with in each case one workpiece. The workpieces are pressed by the workpiece transport comb 40 against a guide rail 61 which has a first guide edge 62. By being rotated through 180°, the guide rail 61 provides a second guide edge 63 if other shapes of workpieces are to be machined. In the event of the workpiece transport comb 40 being disengaged, the workpiece would be released, which is undesirable in the region of workstations. In order to fix a workpiece, the invention proposes a tilting lever 64 with a clamping end 65 and a tilting end 66 which is arranged on an axle 67 between the two ends. At the clamping end 65, a spring-loaded plunger 68 with a ball head 69 engages into a groove 70 of the tilting lever 64. The spring 71 is supported against a spring ring 72 on the plunger 68 and bears with its free end against a plate 78 through which the plungers 68 extend. The plunger 68 can be driven by means of a disengagement mechanism (not illustrated). Said disengagement mechanism is based on a carriage assembly according to the invention, in which the two working sides of a carriage are connected to a curved surface in the manner of a cam, such that, during the linear movement of the carriage, the cam-like curved surface serves to generate a movement of the plunger 68 perpendicular to said carriage.

FIG. 10 finally shows, in the manner of a sketch, a linear assembly line 80 in which six parts are fitted to a workpiece, with the workpieces being transported by a workpiece transport device according to the invention. Likewise illustrated, in each supply line 81, are three carriage assemblies according to the invention, which carriage assemblies are coupled to one another and carry out handling of the parts. Each carriage assembly combination can be activated and deactivated individually, which takes place by means of a zero-point coupling 82 which can be coupled and uncoupled only in a single position. In this way, the timing which must be imperatively adhered to during recoupling into the line is maintained, and repair or exchange work is easy to carry out.

The carriage assemblies according to the invention may be embodied as a transfer device 83 which, for example, permits a gripping movement of gripping tongs and a transporting or transfer movement in the x or y direction and in the z direction.

Furthermore, by using the carriage assemblies according to the invention, an assembly line 80 is created which can be formed with a simple drive arrangement on account of the carriage assemblies being arranged above the workpiece transport plane. In each case one drivetrain is sufficient, which drivetrain leads to a group of carriage assemblies to drive a plurality of carriage assemblies.

The invention highly advantageously permits the realization of a special machine of small construction in tabletop size, in which for example a tabletop die with 25 t forming pressure of approximately 20×20×50 cm in size is combined to form a unit with a workpiece transport device according to the invention and one or two workstations, each fitted with carriage assemblies according to the invention. On account of the simple design, a special machine of said type may be realized on a simple frame. This is due primarily to the small structural size of the carriage assemblies, by means of which it is possible to realize even the smallest of strokes, of a few mm, with the highest degree of precision.

LIST OF REFERENCE SYMBOLS

1 Housing
2 Cam disc
3 Carriage
4 Take-off roller
5 Working cam disc
6 Return cam disc
7 Graphite plain bearing
8 Connecting device
9 Take-off roller bearing arrangement
10 Parting surface
11 Carriage guide
12 Guide plates
13 Cam disc shaft
14 Shaft adapter
15 (Roller-ball) bearing
16 Cross-shaped groove
17 Groove wedge
18 Connecting shaft
19 Rear side
20 Transport comb
21 Rear side of housing
22 Front side of housing
23 Fastening wedge
24 Coupling adapter
25 Web
26 Bearing cover
27 Machine wall
28 Carriage assembly drive
29 Fastening plane
30 Spring-loaded ball pin
40 Workpiece transport comb
41 Deflecting limb
42 Disengagement device
43 Workpiece fixing unit
44 Rail
45 Comb end
46 Driver
47 Tongue
48 Groove
49 Slide
50 Deflecting limb
51 Deflecting lever
52 Axle
53 Bore
54 Bore
55 Pin
56 Recess
57 Chamber
58 Cutout
60 Workpiece clamping arrangement
61 Guide rail
62 First guide edge
63 Second guide edge
64 Tilting lever
65 Clamping end
66 Tilting end
67 Axle
68 Plunger
69 Ball head
70 Groove
71 Spring
72 Spring ring
73 Plate
80 Assembly line
81 Supply line
82 Zero-point coupling
83 Transfer device

The invention claimed is:

1. Carriage assembly having a housing, having a cam disc and having a carriage which is guided in a linearly movable fashion, with the cam disc and carriage being operatively connected to one another, and with the cam disc being arranged orthogonally with respect to a fastening plane of the housing, wherein the cam disc has a working cam disc and spaced apart axially from the latter, a return cam disc, the cam disc is designed to be mounted axially at both sides thereof and the carriage is designed to be guided in the interior of the housing, and that take-off rollers are arranged between the cam disc and carriage, with the carriage having at least one take-off roller bearing arrangement and at least one connecting device.

2. Carriage assembly according to claim 1, wherein the cam disc is composed of hardened material.

3. Carriage assembly according to claim 1, the cam disc is formed in one piece.

4. Carriage assembly according to claim 1, wherein two connecting devices are produced which are situated opposite on both working sides of the carriage.

5. Carriage assembly according to claim 1, wherein the carriage is formed in at least two parts.

6. Carriage assembly according to claim 5, wherein the carriage comprises at least two parts with a parting surface which is parallel to the fastening plane of the housing.

7. Carriage assembly according to claim 1, wherein the housing is formed in at least two parts.

8. Carriage assembly according to claim 7 wherein the housing comprises at least two parts with a parting surface which is parallel to the fastening plane.

9. Carriage assembly according to claim 7, wherein the housing has, arranged in its interior, a carriage guide.

10. Carriage assembly according to claim 9, wherein the carriage guide is in the form of a plurality of guide plates.

11. Carriage assembly according to claim 1, wherein said carriage assembly has a cam disc shaft which supports the cam disc and which is of multi-part design comprising a plurality of parts, with a detachable locking device being provided between some of the parts in such a way that the cam disc is removeable from the cam disc shaft.

12. Carriage assembly according to claim 11, wherein the locking device is formed as a cross-shaped groove with a groove wedge in those parts of the cam disc shaft which is removeable together with the cam disc, and in that other parts of the cam disc shaft are formed so as to remain in the device.

13. Carriage assembly according to claim 12, wherein other parts of the cam disc shaft are formed so as to remain in bearings.

14. System composed of a plurality of carriage assemblies according to claim 1, wherein individual carriage assemblies are designed such that they are connectable to one another by means of connecting shafts at the ends of the cam disc shafts or by means of direct form-fitting engagement of the cam disc shafts into one another.

15. Use of a carriage assembly according to claim 1 as a controller or a drive of a handling device, wherein at least one carriage assembly, having a housing, having a cam disc and having a carriage which is guided in a linearly movable fashion, with the cam disc and carriage being operatively connected to one another, and with the cam disc being arranged orthogonally with respect to a fastening plane of the housing, whereby a carriage with two connecting devices, which carriage is designed to be connected to the handling device.

16. Handling device for a workpiece transport device, having a workpiece transport comb, having a disengagement device which is articulatedly connected to said workpiece transport comb by means of a deflecting limb, whereby the workpiece transport comb and disengagement device being arranged, each on one carriage assembly, said carriage assembly having a housing and a cam.

17. Handling device according to claim 16, wherein a workpiece fixing unit is provided.

18. Handling device according to claim 16, in which the workpiece fixing unit is embodied as a tilting lever which is designed to be driven by said carriage assembly.

* * * * *